United States Patent
Kim et al.

(10) Patent No.: US 6,743,744 B1
(45) Date of Patent: Jun. 1, 2004

(54) LOW TEMPERATURE SINTERABLE AND LOW LOSS DIELECTRIC CERAMIC COMPOSITIONS AND METHOD THEREOF

(75) Inventors: Yoon-Ho Kim, Seoul (KR); Hyo-Tae Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 30 days.

(21) Appl. No.: 10/019,666

(22) PCT Filed: Aug. 31, 2000

(86) PCT No.: PCT/KR00/00984

§ 371 (c)(1),
(2), (4) Date: May 17, 2002

(87) PCT Pub. No.: WO01/83395

PCT Pub. Date: Nov. 8, 2001

(30) Foreign Application Priority Data

May 3, 2000 (KR) .......................... 2000-23676

(51) Int. Cl.⁷ .................... C04B 35/462; C04B 35/465; H01G 4/10; H01G 4/30
(52) U.S. Cl. .................... 501/134; 501/136; 361/321.4; 361/321.5
(58) Field of Search ................. 501/134, 136; 361/321.4, 321.5

(56) References Cited

U.S. PATENT DOCUMENTS

| | | | |
|---|---|---|---|
| 5,767,030 A | * | 6/1998 | Kim et al. .................. 501/136 |
| 5,866,492 A | | 2/1999 | Kim et al. |
| 5,916,030 A | * | 6/1999 | Warner .......................... 472/65 |

FOREIGN PATENT DOCUMENTS

| | | |
|---|---|---|
| JP | 06-312449 A | 11/1994 |
| KR | 93-0020437 A | 10/1993 |
| KR | 95-0045810 A | 11/1995 |
| KR | 96-0050579 A | 10/1996 |
| KR | 1019980141401 | 3/1998 |
| KR | 1019980162876 | 9/1998 |
| KR | 1019981078328 | 11/1998 |
| KR | 1019990225881 | 7/1999 |
| KR | 1020000009735 | 2/2000 |

OTHER PUBLICATIONS

CAPLUS 2003:354765, Kim et al, "Structure and microwave dielectric properties . . . ", 2003.*
CAPLUS 1999:593074, Kim et al, "Microwave dielectric ceramics . . . " 1999.*
CAPLUS 1999:818005, Kim et al. "Low–temperature sintering and . . . " 1999.*
CAPLUS 2000:41577, Kim et al., "Low–fired (Zn,Mg)TiO3 microwave dielectrics" 2000.*
CAPLUS 2000:896800, Purvanova et al, "Preparation and some properties of . . . " 1999.*
CAPLUS 1998:395995, Kim et al, "Microstructure and microwave dielectric properties . . . " 1998.*
CAPLUS 1977:537379, Sheinkman et al, "Phase formation sequence during the reaction . . . " 1977.*

* cited by examiner

*Primary Examiner*—David Brunsman
(74) *Attorney, Agent, or Firm*—Morrison & Foerster LLP

(57) ABSTRACT

A low loss high-frequency dielectric ceramic composition for sintering at a low temperature and method of manufacturing the same which is characterized in that excellent dielectric properties such as a much lower sintering temperature and higher quality coefficient and dielectric constant, compared to a conventional high-frequency ceramic composition, a stabilized temperature coefficient, and a temperature compensating property varied according to a composition, are implemented using a low-priced material such as ZnO—Mo (M=Mg, Co, Ni)—$TiO_2$. In addition, Ag, Cu, an alloy thereof, or an Ag/Pd alloy can be used as an internal electrode. Thus, the composition of the present invention can be used as a dielectric material for all sorts of high-frequency devices, such as a multilayer chip capacitor, multilayer chip filter, multilayer chip capacitor/inductor composite device and module, low temperature sintered substrate, resonator or filter and ceramic antenna.

8 Claims, 1 Drawing Sheet

LOW TEMPERATURE SINTERABLE AND LOW LOSS DIELECTRIC CERAMIC COMPOSITIONS AND METHOD THEREOF

This is a 371 of PCT/KR00/00984, filed 30 Aug. 2000.

TECHNICAL FIELD

The present invention relates to a low temperature sinterable and low loss dielectric ceramic compositions for use in fabricating various high frequency devices such as a multilayer chip capacitor, a multilayer chip filter, a multilayer chip capacitor inductor composite device and module, a low temperature sinterable substrate, a resonator or a filter and a ceramic antenna, and its method.

BACKGROUND ART

Recently with the rapid development in a mobile communication and a satellite communication, a high frequency dielectric ceramics is in a high demand as a material for a high frequency integrated circuit or a dielectric resonator.

Major characteristics of the dielectric ceramics used for a high frequency includes a high dielectric constant ($\epsilon_r$), a quality factor (Q) and a stable and tunable temperature coefficient ($\tau_f$) of a resonance frequency.

Representative high frequency dielectric compositions which have been widely known up to now are (Zr, Sn)TiO$_4$ group, BaO—TiO$_2$ group, (Mg, Ca)TiO$_3$ group, and Ba—(Zn$_{1/3}$Ta$_{2/3}$)O$_3$, Ba(Mg$_{1/3}$Ta$_{2/3}$)O$_3$, Ba(Zn$_{1/3}$Nb$_{2/3}$)O$_3$ as Ba-peropskite group etc.

However, these compositions are disadvantages in that they are mostly fired at a high temperature of 1,300~1,500° C., phase synthesis is not easy, a dielectric constant is low or a high-priced material should be used.

Besides, lately, advancement of a portable information communication devices lead to development of various types of substrates and multi-chip module (MCM) by a multilayer chip high frequency devices or low temperature co-firing ceramics (LTCC), and a research and development of a low temperature firing high performance high frequency ceramics are conducted accordingly.

However, there are problems that the performance of the high frequency characteristic is considerably degraded such as, for example, most of them are not sufficient in terms of density when being fired at a low temperature, a dielectric constant is decreased according to addition of a sintering aid, a quality factor is degraded and a temperature factor is changed.

In addition, silver or copper conduct with a small high frequency loss and a cofiring available low temperature firing high frequency dielectric ceramic are very rare.

Therefore, an object of the present invention is to provide a dielectric ceramics composition which can be fired at a very low temperature but has an excellent high frequency dielectric characteristic of various temperature compensation characteristics according to a high quality factor, a dielectric constant, a stable temperature factor and a composition, and can be implemented at a low cost.

Another object of the present invention is to provide a dielectric ceramics composition which can employ Ag, Cu, their alloy or a Ag/Pd alloy as an internal electrode and thus be used for various high frequency devices, such as a multilayer chip capacitor, a multilayer chip filter, a multilayer chip capacitor/inductor composite device and a low temperature sinterable substrate, a resonator and a filter or a ceramic antenna.

DETAILED DESCRIPTION OF THE INVENTION

In order to achieve the above objects, there is provided a dielectric ceramics composition which is constructed by combining 1 mole of (Zn$_{1-x}$M$_x$) TiO$_3$ and yTiO$_2$(0≦y≦0.6 as a main component, one of 0~5 wt % B$_2$O$_3$, 0~5 wt % H$_3$BO$_3$, 0~5 wt % SiO$_2$—K$_2$O glass, 0~5 wt % B$_2$O$_3$ and SiO$_2$—K$_2$O glass, or 0~5 wt % H$_3$BO$_3$ and SiO$_2$—K$_2$O glass is added as an additive thereto, and fired at a low temperature of 800~925° C., its preparation method, and a high frequency dielectric ceramics device using the same. In this respect, 'M' is one of Mg, Co, Ni, 'x' is 0≦x≦0.55 in case of Mg and 'x' is 0≦x≦1 in case of Co, and 0≦x≦1 in case of Ni

MODE FOR CARRYING OUT THE PREFERRED EMBODIMENTS

Figure 1:
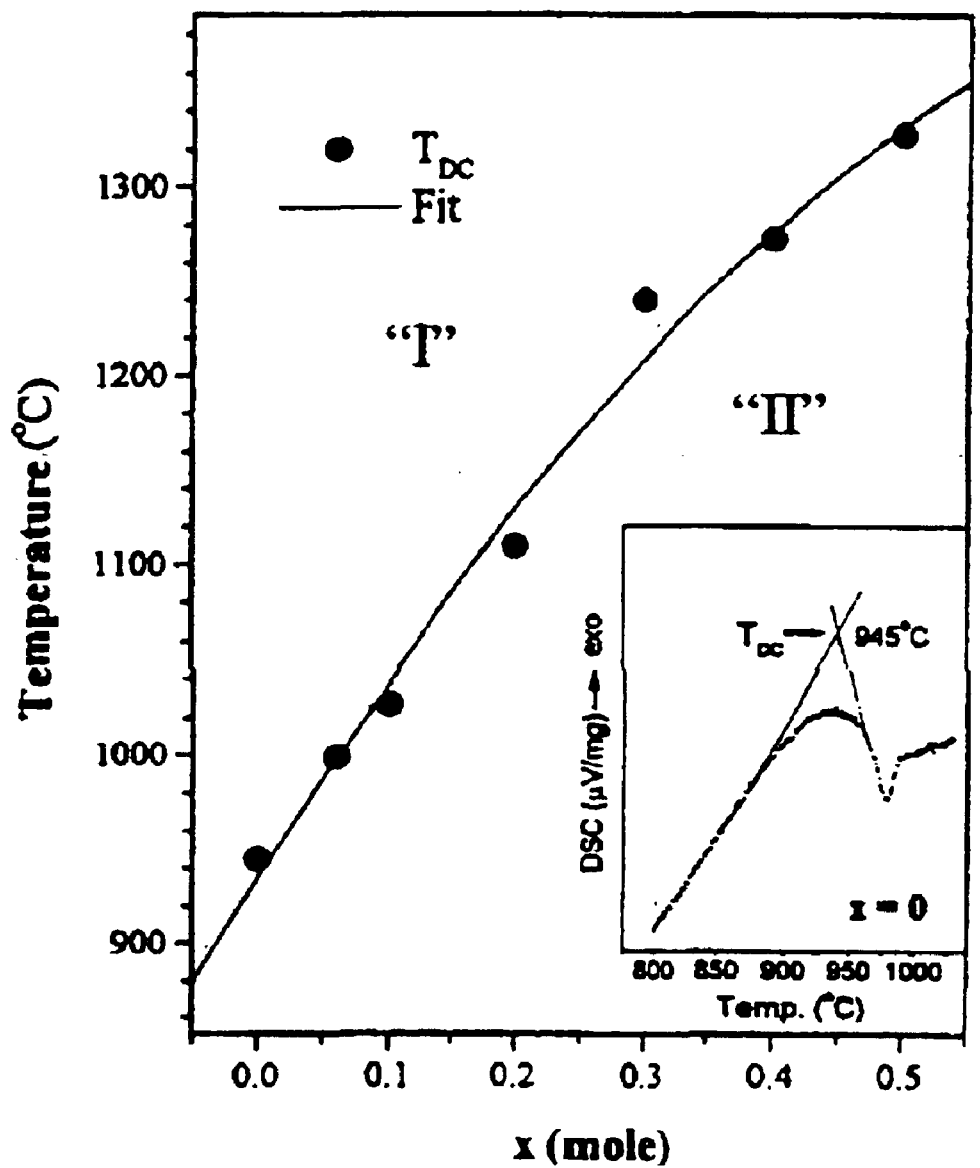
FIG. 1 is a graph showing a phase dissociation temperature of (Zn$_{1-x}$M$_x$)TiO$_3$ according to the substituted amount of Mg.

The present invention will now be described with reference to accompanying drawings.

A high frequency dielectric ceramics composition of the present invention is characterized in that it has a very low firing temperature (800~925° C.) compared to that of a conventional dielectric composition, has an excellent high frequency dielectric characteristic of various temperature compensation characteristics ($\tau f$=−52~+104 ppm/° C.) according to a high quality factor (Q)×f=12,000~84,000 GHz), a dielectric constant (16≦$\epsilon r$≦32), a stable temperature factor and a composition, and can be implemented with a low-priced material such as ZnO, MgO, CoO, NiO, TiO$_2$, In addition, the high frequency dielectric ceramics composition of the present invention is also characterized in that it employs Ag, Cu, their alloy or a Ag/Pd alloy as n internal electrode and thus be used for various high frequency devices, such as a multilayer chip capacitor, a multilayer chip filter, a multilayer chip capacitor/inductor composite device and a low temperature firing substrate, a resonator and a filter or a ceramic antenna.

In the present invention, the low temperature firing composition of the present invention has an excellent quality factor (close to the existing high temperature firing composition) more than several times the existing one. In addition, in the claimed composition coverage, combination of composition having an excellent high frequency characteristic of the almost infinite number can be obtained compared to any of the conventional ones.

ZnTiO$_3$ (crystal structure has a rhombohedral symmetry) is phase-dissociated to Zn$_2$TiO$_4$ (cubic symmetry) and TiO$_2$ (rutile) at a higher temperature than 945° C. (refer to FIG. 303 of Phase Diagrams for Ceramist by the American Ceramic Society, System ZnO—TiO$_2$ by Dulin and Rase), and thus, it is very difficult to be prepared.

In order to obtain a pure ZnTiO$_3$, phase synthesis and firing must be made at a below 945° C. A preliminary experiment of the present invention shows a result through an X-ray diffraction analysis that phase dissociation starts at near 925° C. so that a thermal treatment must be performed at below 925° C.

In a preferred embodiment of the present invention, in order to remove the shortcomings, Zn$^{2+}$, a positive ion of A-site constituting an ABO$_3$ type ilmenite phase ceramics, is substituted with $Mg^{2+}$ (up to 0.55 mole), to thereby enlarge a thermal stabilization temperature of $ZnTiO_3$ to a high temperature range (refer to FIG. 1), so that the preparation process coverage is widened and the high frequency dielectric characteristic are highly improved.

FIG. 1 is a graph showing a phase dissociation temperature of $(Zn_{1-x}Mg_x)TiO_3$ according to the substituted amount of Mg. In case that a region x=0, $ZnTiO_3$ is dissociated at a temperature of 945° C., and since the dissociation temperature goes up to a high temperature by the substitution of Mg, a single phase of the $(Zn_{1-x}Mg_x)TiO_3$ solid solution can be synthesized or fired even at a temperature of higher than 945° C.

Accordingly, a single phase can be obtained anywhere in the region II of FIG. 1, which is the phase synthesis region of the present invention.

A high frequency dielectric ceramics composition in accordance with a preferred embodiment of the present invention will now be described.

Powders (an average particle diameter is 1 $\mu$m) of ZnO, MO (in this respect, MO is MgO, CoO or NiO) and $TiO_2$ (>99%) was weighed according to a composition range of $(Zn_{1-x}M_x)TiO_3$ and $yTiO_2$ (M is one of Mg, Co and Ni, x is $0 \leq x \leq 0.55$ in case of Mg, x is $0 \leq x \leq 1$ in case of Co, x is $0 \leq x \leq 1$ in case of Ni, and y is $0 \leq y \leq 0.6$), mixed in a wet ball mill method, dried at 120° C., and calcined and synthesized at a temperature of 850~950° C. for four hours.

The calcined powder was mixed with 0.5 wt % $B_2O_3$, 0~5 wt % $SiO_2$—$K_2O$ glass and a combination of 0~10 wt % $B_2O_3$ and $SiO_2$—$K_2O$ as a sintering aid.

At this time, in case of $B_2O_3$, besides the oxide, a water soluble boron ($H_3BO_3$) was used to improve homogeneity in adding a little amount.

Solubility (per water 100 cc) of boron to cool water (30° C.) and hot water (100° C.) is 6.35 and 27.6 (refer to Handbook of Chemistry and Physics, 55$^{th}$ ed., CRC Press, 1974-75).

In case of the present invention, cool water was used to make boron corresponding to the solubility to an aqueous solution, into which the main component or the main composition and the glass powder are mixed and crushed.

In crushing, since the temperature of slurry goes up further (especially, up to 45° C. in case of high speed centrifugal crushing), the mixture of boron can be more uniform.

As for the $SiO_2$—$K_2O$ glass, $SiO_2$ and $K_2CO_3$ were mixed with $K_2CO_3$ by 55~75 wt % and 25~45 wt %, melt at a temperature of 1100~1200° C., quenched at cool deionized water, ball-milled for 24 hours, thereby obtaining glass powder, and it was confirmed that an amorphous phase of glass was obtained according to an X-ray diffraction analysis result.

Since the present invention is aimed at a low temperature firing at a below 925° C., in order to obtain fine powder (average particle diameter of below 0.5 $\mu$m) less than submicron, a stabilized zirconia ball with a diameter of 2 mm was used and crushed for four hours by an attrition mill, or a fine stabilized zirconia ball with a diameter of 1 mm was used and subjected to a high speed centrifugal crushing for 5~10 minutes.

An aqueous solution to which 2 wt % PVA binder was added is mixed with the dried powder to make a granule of about 150 $\mu$m and shaped to a disk test sample having a diameter of 8 mm and a thickness of 3.8 mm at a pressure of 98 Mpa.

The shaped test sample was maintained at a temperature of 300~500° C. for over 3 hours to burn out the binder, and then sintered at a temperature 800~925° C. at an atmosphere.

At this time, a heating rate was 10° C./min. The sintered test sample was ground with an SiC polishing paper (#1,500) to obtain about 0.45 ratio of diameter to thickness of the test sample.

The high frequency dielectric characteristic was measured in a $TE_{01\delta}$ mode by using a network analyzer (HP 8720C) by making a cylindrical dielectric ceramics resonator, and a dielectric constant was measure by a Hakki-Coleman method, a quality factor was measure by an open cavity method, a temperature factor of a resonance frequency was measured by an invar cavity at a temperature range of +20~+70° C.

Table 1 shows a high frequency dielectric characteristic in case that $B_2O_3$, boron (H3BO3) and a combination component of boron and $SiO_2$—$K_2O$ glass are added as sintering aids toga main composition that x=0.01 and y=012 among $(Zn_{1-x}M_x)TiO_3(0 \leq x \leq 0.55)$ and $yTiO_2 0 \leq y \leq 0.6$) composition.

In Table 1, a 800° C.-sintered body had about more than 92% relative density, and 875° C.-sintered body had about more than 97% relative density.

In the embodiments 2~5 and 6~10, it is noted that quality factor was further improved in case of adding boron instead of adding $B_2O_3$, and as for the temperature coefficient, the variation rate according to the sintering temperature (800° C. and 875° C.) was smaller. This effect results from a uniformity of boron.

As the sintering characteristic thanks to addition of $B_2O_3$, the dielectric constant and quality factor were much increased, and were increased up to about 2 wt % and then reduced at 5 wt %.

The temperature coefficient was moved to a positive as the amount of $B_2O_3$ is increased.

Accordingly, in the embodiments of Table 1, it is anticipated that if the value 'y' is a bit increased more than 0.2 and the amount of additive is controlled, an excellent dielectric property of which the temperature factor is almost '0' can be obtained.

That is, in order to be a usable high frequency characteristic, not only $TiO_2$, but the amount of additive needs to be controlled property, and accordingly, various composition groups can be obtained.

TABLE 1

High frequency dielectric property of a dielectric resonator fabricated with composition of $(Zn_{0.99}M_{0.01})TiO_3$ (M = Mg) + $0.2TiO_2$ + ($B_2O_3$, $H_3BO_3$, or $H_3BO_3$ + $SiO_2$—$K_2O$ glass)

| No. | $B_2O_3$ (wt %) | $H_3BO_3$ (wt %) | $SiO_2$—$K_2O$ glass (wt %) | Sintering temperature (° C.) | Dielectric constant ($\epsilon_r$) | Quality factor (Qxf GHz) | Temperature coefficient ($\tau f$:ppm/° C.) |
|---|---|---|---|---|---|---|---|
| 1 | — | — | — | 800 | 13.8 | 22900 | −22 |
|   |   |   |   | 875 | 21.1 | 32400 | −50 |
| 2 | 0.25 | — | — | 800 | 22.3 | 65700 | −52 |
|   |   |   |   | 875 | 26.9 | 78200 | −48 |
| 3 | 0.50 | — | — | 800 | 23.0 | 54800 | −43 |
|   |   |   |   | 875 | 26.4 | 84600 | −40 |
| 4 | 1.00 | — | — | 800 | 19.7 | 50100 | −44 |
|   |   |   |   | 875 | 26.5 | 80900 | −33 |

TABLE 1-continued

High frequency dielectric property of a dielectric resonator fabricated with composition of $(Zn_{0.99}M_{0.01})TiO_3$ (M = Mg) + $0.2TiO_2$ + $(B_2O_3$, $H_3BO_3$, or $H_3BO_3$ + $SiO_2$—$K_2O$ glass)

| No. | $B_2O_3$ (wt %) | $H_3BO_3$ (wt %) | $SiO_2$—$K_2O$ glass (wt %) | Sintering temperature (° C.) | Dielectric constant ($\epsilon_r$) | Quality factor (Qxf GHz) | Temperature coefficient (τf:ppm/° C.) |
|---|---|---|---|---|---|---|---|
| 5 | 2.00 | — | — | 800 | 19.6 | 44800 | −29 |
|  |  |  |  | 875 | 27.2 | 79300 | −22 |
| 6 | — | 0.25 | — | 800 | 22.1 | 59800 | −46 |
|  |  |  |  | 875 | 27.0 | 84300 | −43 |
| 7 | — | 0.50 | — | 800 | 20.2 | 50600 | −44 |
|  |  |  |  | 875 | 26.0 | 85200 | −39 |
| 8 | — | 1.00 | — | 800 | 19.3 | 47700 | −33 |
|  |  |  |  | 875 | 26.3 | 81200 | −34 |
| 9 | — | 2.00 | — | 800 | 19.5 | 45400 | −40 |
|  |  |  |  | 875 | 26.7 | 70100 | −20 |
| 10 | — | 5.00 | — | 800 | 16.5 | 40000 | −10 |
|  |  |  |  | 875 | 25.1 | 60200 | +20 |
| 11 | — | 0.50 | 0.50 | 800 | 19.5 | 55800 | −43 |
|  |  |  |  | 875 | 25.8 | 67200 | +39 |
| 12 | — | 0.50 | 1.00 | 800 | 17.0 | 42400 | −20 |
|  |  |  |  | 875 | 23.6 | 58400 | −38 |
| 13 | — | 0.50 | 2.00 | 800 | 16.7 | 26300 | −17 |
|  |  |  |  | 875 | 23.8 | 45100 | −36 |
| 14 | — | 0.50 | 3.00 | 800 | 15.4 | 25000 | −21 |
|  |  |  |  | 875 | 24.1 | 36200 | −29 |
| 15 | — | 0.50 | 5.00 | 800 | 13.7 | 19100 | −19 |
|  |  |  |  | 875 | 23.4 | 24500 | −43 |

Table 2 indicates a dielectric property in case of increasing the amount of Mg and $TiO_2$ (x=0.55, Y=0.6).

TABLE 2

High frequency dielectric property of a dielectric resonator fabricated with composition of $(ZnO_{0.45}M_{0.55})TiO_3$ (M = Mg) + $0.6TiO_2$ + $(B_2O_3$, $H_3BO_3$, or $H_3BO_3$ + $SiO_2$—$K_2O$ glass)

| No. | $B_2O_3$ (wt %) | $H_3BO_3$ (wt %) | $SiO_2$—$K_2O$ glass (wt %) | Sintering temperature (° C.) | Dielectric constant ($\epsilon_r$) | Quality factor (Qxf GHz) | Temperature coefficient (τf:ppm/° C.) |
|---|---|---|---|---|---|---|---|
| 16 | — | — | — | 900 | 20.2 | 18300 | +60 |
|  |  |  |  | 925 | 24.3 | 20700 | +56 |
| 17 | 0.25 | — | — | 900 | 26.9 | 19700 | +54 |
|  |  |  |  | 925 | 30.1 | 35300 | +78 |
| 18 | 0.50 | — | — | 900 | 26.9 | 20300 | +57 |
|  |  |  |  | 925 | 29.5 | 44000 | +65 |
| 19 | 1.00 | — | — | 900 | 26.0 | 22300 | +51 |
|  |  |  |  | 925 | 28.4 | 35300 | +87 |
| 20 | 2.00 | — | — | 900 | 25.7 | 22400 | +57 |
|  |  |  |  | 925 | 28.6 | 30500 | +79 |
| 21 | — | 0.25 | — | 900 | 27.3 | 23200 | +72 |
|  |  |  |  | 925 | 30.1 | 58900 | +86 |
| 22 | — | 0.50 | — | 900 | 26.5 | 23000 | +72 |
|  |  |  |  | 925 | 29.3 | 46000 | +70 |
| 23 | — | 1.00 | — | 900 | 25.3 | 23100 | +55 |
|  |  |  |  | 925 | 28.2 | 33400 | +73 |
| 24 | — | 2.00 | — | 900 | 25.5 | 21700 | +68 |
|  |  |  |  | 925 | 28.1 | 27300 | +88 |
| 25 | — | 5.00 | — | 900 | 23.7 | 21200 | +75 |
|  |  |  |  | 925 | 27.5 | 16600 | +104 |
| 26 | — | 0.50 | 0.50 | 900 | 22.8 | 27900 | +54 |
|  |  |  |  | 925 | 26.8 | 22700 | +79 |
| 27 | — | 0.50 | 1.00 | 900 | 24.2 | 29800 | +46 |
|  |  |  |  | 925 | 29.0 | 26800 | +76 |
| 28 | — | 0.50 | 2.00 | 900 | 28.4 | 22300 | +65 |
|  |  |  |  | 925 | 32.0 | 17900 | +71 |
| 29 | — | 0.50 | 3.00 | 900 | 28.9 | 27600 | +49 |
|  |  |  |  | 925 | 32.5 | 19500 | +84 |
| 30 | — | 0.50 | 5.00 | 900 | — | 21200 | +33 |
|  |  |  |  | 925 | — | 11900 | +53 |

In the above embodiments, positive temperature coefficients were obtained. In this case, a temperature coefficient of '0' can be naturally obtained by adequately reducing the amount of $TiO_2$.

Meanwhile, in case that x>0.55, the dielectric constant and the quality factor were much degraded than those of the present invention, and most of all, the sintering characteristic is degraded as the amount of Mg is increased.

Table 3 indicates a composition exhibiting an excellent dielectric property with a temperature coefficient of '0' on the basis of Table 1 and Table 2.

TABLE 3

High frequency dielectric property of a dielectric resonator fabricated with a composition of $(ZnO_{0.70}M_{0.30})TiO_3$ (M = Mg) + $0.2TiO_2$ + $(B_2O_3$, + $SiO_2$—$K_2O$ glass)

| No. | $B_2O_3$ (wt %) | $SiO_2$—$K_2O$ glass (wt %) | Sintering temperature (° C.) | Dielectric constant ($\epsilon_r$) | Quality factor (Qxf GHz) | Temperature coefficient (τf:ppm/° C.) |
|---|---|---|---|---|---|---|
| 31 | — | 0.50 | 925 | 16.6 | 26900 | −16 |
| 32 | 0.25 |  |  | 24.5 | 65300 | −11 |
| 33 | 0.50 |  |  | 24.9 | 69700 | −6 |
| 34 | 1.00 |  |  | 24.7 | 74700 | −10 |
| 35 | 1.50 |  |  | 24.4 | 69000 | −1 |
| 36 | 2.00 |  |  | 24.2 | 67300 | −5 |
| 37 | — | 1.00 | 925 | 17.1 | 27200 | −27 |
| 38 | 0.25 |  |  | 24.8 | 58500 | −14 |
| 39 | 0.50 |  |  | 25.0 | 59200 | −7 |
| 40 | 1.00 |  |  | 25.0 | 59300 | −2 |
| 41 | 1.59 |  |  | 24.7 | 55400 | 0 |
| 42 | 2.00 |  |  | 24.5 | 55800 | +1 |
| 43 | — | 2.00 | 925 | 18.3 | 20300 | −14 |
| 44 | 0.25 |  |  | 25.1 | 52200 | −9 |
| 45 | 0.50 |  |  | 25.2 | 52700 | −4 |
| 46 | 1.00 |  |  | 25.0 | 55700 | +5 |
| 47 | 1.50 |  |  | 25.3 | 48100 | +2 |
| 48 | 2.00 |  |  | 24.9 | 50800 | +14 |
| 49 | — | 3.00 | 900 | 17.6 | 25400 | −24 |
| 50 | 0.25 |  |  | 21.9 | 33600 | −20 |
| 51 | 0.50 |  |  | 23.8 | 39100 | −10 |
| 52 | 1.00 |  |  | 25.6 | 38400 | +17 |
| 53 | 1.50 |  |  | 25.6 | 44800 | +20 |
| 54 | 2.00 |  |  | 25.5 | 42100 | +26 |
| 55 | — | 5.00 | 900 | 19.5 | 19500 | −17 |
| 56 | 0.25 |  |  | 21.8 | 27100 | −20 |
| 57 | 0.50 |  |  | 22.8 | 30700 | −32 |
| 58 | 1.00 |  |  | 23.9 | 31600 | −11 |
| 59 | 1.50 |  |  | 25.0 | 36800 | +24 |
| 60 | 2.00 |  |  | 25.1 | 37700 | +31 |

In the embodiments 32~60, an excellent dielectric property with a dielectric constant of more than 24, a quality factor of more than 50000 and a temperature factor of ±30ppm/° C. was obtained from the combination of less than 2 wt % $B_2O_3$(or $H_3BO_3$) and $SiO_2$—$K_2O$ glass.

Table 4 shows an influence of B2O3 and H3BO3 additive for the composition of $(Zn_{0.70}Mg_{0.30})TiO_3$ and $0.2TiO_2$.

TABLE 4

High frequency dielectric property of a dielectric resonator fabricated with a composition of $(ZnO_{0.70}M_{0.30})TiO_3$ (M = Mg) + $0.2TiO_2$ + ($B_2O_3$, or $H_3BO_3$)

| No. | $B_2O_3$ (wt %) | $H_2BO_3$ (wt %) | Sintering temperature (° C.) | Dielectric constant ($\epsilon_r$) | Quality factor (Qxf GHz) | Temperature coefficient (τf:ppm/° C.) |
|---|---|---|---|---|---|---|
| 61 | — | — | 900 | 19.3 | 51200 | −31 |
|  |  |  | 925 | 22.5 | 84400 | −29 |
| 62 | 0.25 | — | 900 | 23.6 | 50000 | −23 |
|  |  |  | 925 | 25.7 | 86100 | −16 |
| 63 | 0.50 | — | 900 | 22.8 | 44000 | −23 |
|  |  |  | 925 | 25.5 | 77400 | −13 |
| 64 | 1.00 | — | 900 | 22.4 | 46300 | −15 |
|  |  |  | 925 | 25.2 | 78000 | +1 |
| 65 | 2.00 | — | 900 | 23.1 | 56600 | 0 |
|  |  |  | 925 | 25.8 | 87600 | −1 |
| 66 | — | 0.25 | 900 | 23.5 | 52000 | −16 |
|  |  |  | 925 | 25.3 | 84300 | −15 |
| 67 | — | 0.50 | 900 | 23.6 | 46200 | −6 |
|  |  |  | 925 | 25.3 | 81700 | −7 |
| 68 | — | 1.00 | 900 | 23.6 | 53700 | −10 |
|  |  |  | 925 | 25.2 | 79300 | −5 |
| 69 | — | 2.00 | 900 | 24.5 | 56600 | −12 |
|  |  |  | 925 | 26.1 | 77200 | −7 |
| 70 | — | 5.00 | 900 | 16.5 | 40000 | −4 |
|  |  |  | 925 | 25.1 | 60200 | −4 |

In the embodiments 62~65 and 66~69. it is noted that the dielectric constant and the quality factor were higher when H3BO3 were added than B2O3, and especially, the stability of the temperature factor according to the sintering temperature was excellent, which testifies the effect of the present invention.

In the present invention, a high frequency dielectric ceramics composition may be constituted by combining a combination of $(Zn_{1-a}Mg_{1-b}CO_{1-c}Ni_{1-d})TiO_3$ and $yTiO_2$ as a main component and one of 0~5 wt % $B_2O_3$, 0~5 wt % $H_3BO_3$, 0~5 wt % $SiO_2$—$K_2O$ glass, 0~5 wt % $B_2O_3$ and $SiO_2$—$K_2O$ glass, or 0~5 wt % $H_3BO_3$ and $SiO_2$—$K_2O$ glass as an additive, which satisfies conditions of $0 \leq a \leq 1$, $0 \leq b \leq 1$, $0 \leq c \leq 1$, $0 \leq d \leq 1$ and $0 \leq y \leq 0.6$.

INDUSTRIAL APPLICABILITY

As so far described, a high frequency dielectric characteristic having an excellent various temperature compensation varied according to the high quality factor, the dielectric constant and the stable temperature coefficient and composition but having a very low sintering temperature compared with the conventional dielectric composition can be implemented at a low-priced material such as ZnO, MgO, CoO, NiO or $TiO_2$.

In addition, since Ag, Cu or their alloy or Ag/Pd alloy can be used as an internal electrode, and thus, can be used as various high frequency devices, i.e., a multilayer chip capacitor, a multilayer chip filter, a multilayer chip capacitor/inductor composite device and a low-temperature sinterable substrate, a resonator and a filter or a ceramic antenna.

Especially, the low-temperature sintered composition obtains a remarkably high quality factor more than several times that of the conventional one.

In addition, combination of the almost infinite number of compositions exhibiting the excellent high frequency characteristic can be obtained in the composition range of the present invention.

What is claimed is:

1. A high frequency dielectric ceramics composition constituted by combining a combination of $(Zn_{1-x}M_x)TiO_3$ and $yTiO_2$ as a main component, into which one of 0~5 wt % $B_2O_3$, 0~5 wt % $H_3BO_3$, 0~5 wt % $SiO_2$—$K_2O$ glass, 0~5 wt % $B_2O_3$ and $SiO_2$—$K_2O$ glass, or 0~5 wt % $H_3BO_3$ and $SiO_2$—$K_2O$ glass is added as an additive, satisfies conditions of M is Mg, Co or Ni, 'x' is $0<x \leq 0.55$ in case of Mg and 'x' is $0<x \leq 1.0$ in case of Co, and $0<x \leq 1.0$ in case of Ni, and $0<y \leq 0.6$.

2. High frequency devices comprising the composition of claim 1.

3. The high frequency devices of claim 2, wherein the high frequency devices are selected from the group consisting of a stacked chip capacitor, a stacked chip filter, a stacked chip capacitor/inductor composite device and a module, a low-temperature sintered board, a resonator, a filter, a ceramic antenna and combinations thereof.

4. A high frequency dielectric ceramics composition preparation method in which material powder of ZnO, MO (in this respect, MO is MgO, CoO or NiO) and $TiO_2$ is weighed according to a composition range of $(Zn_{1-x}M_x)TiO_3$ and $yTiO_2$ (M is one of Mg, Co and Ni, x is $0 \leq x \leq 0.55$ in case of Mg, x is $0 \leq x \leq 1$ in case of Co, x is $0 \leq x \leq 1$ in case of Ni, and y is $0 \leq y \leq 0.6$), mixed and dried, the dried powder is calcined at a temperature of 850~950° C., the calcined powder is mixed with one of 0~5 wt % $B_2O_3$, 0~5 wt % $H_3BO_3$, 0~5 wt % $SiO_2$—$K_2O$ glass, 0~5 wt % $B_2O_3$ and $SiO_2$—$K_2O$ glass, or 0~5 wt % $H_3BO_3$ and $SiO_2$—$K_2O$ glass as an additive, the mixed powder is crushed, the crushed power is shaped, the shaped body is fired at a temperature of 800~925° C., and $(Zn_{1-x}M_x)TiO_3$ is calcined at a temperature corresponding to a region (region II) of below a phase dissociation temperature as shown in FIG. 1 to obtain $(Zn_{1-x}M_x)TiO_3$(M is Mg, Co or Ni) of a single phase of rhombohedral/hexagonal crystal.

5. The method of claim 4, wherein the shaped body is made in a manner that an aqueous solution adding a PVA binder is sprayed onto the crushed powder to make a granule, to which a pressure is applied.

6. The method of claim 5, further comprises a step for maintaining the shaped body at a temperature of 300~500° C. for a predetermined time and removing the binder.

7. The method of claim 4, wherein $(Zn_{1-x}M_1)TiO_3$ is first calcined, and the calcined $(Zn_{1-x}M_x)TiO_3$ is mixed with one of 0~5 wt % $B_2O_3$, 0~5 wt % $H_3BO_3$, 0~5 wt % $SiO_2$—$K_2O$ glass, 0~5 wt % $B_2O_3$ and $SiO_2$—$K_2O$ glass, or 0~5 wt % $H_3BO_3$ and $SiO_2$—$K_2O$ glass as an additive, and then fired.

8. A high frequency dielectric ceramics composition constituted by combining a combination $(Zn_{1-a}Mg_{1-b}Co_{1-c}Ni_{1-d})TiO_3$ and $yTiO_2$ as a main component, into which one of 0~5 wt % $B_2O_3$, 0~5 wt % $H_3BO_3$, 0~5 wt % $SiO_2$—$K_2O$ glass, 0~5 wt % $B_2O_3$ and $SiO_2$—$K_2O$ glass, or 0~5 wt % $H_3BO_3$ and $SiO_2$—$K_2O$ glass is added as an additive, satisfies conditions of $0<a \leq 1$, $0<b \leq 1$, $0<c \leq 1$, $0<d \leq 1$ and $0<y \leq 0.6$.

* * * * *